United States Patent [19]

Purvis et al.

[11] Patent Number: 6,001,462
[45] Date of Patent: Dec. 14, 1999

[54] LAMINATED GLAZING UNIT WITH POLYVINYL CHLORIDE INTERLAYER

[75] Inventors: Micheal B. Purvis, Perrysburg; Anthony A. Parker; David A. Strickler, both of Toledo, all of Ohio

[73] Assignee: Libbey-Owens-Ford Co., Toledo, Ohio

[21] Appl. No.: 08/611,689

[22] Filed: Mar. 6, 1996

Related U.S. Application Data

[63] Continuation of application No. 08/246,816, May 20, 1994, abandoned, which is a continuation-in-part of application No. 08/182,757, Jan. 18, 1994.

[51] Int. Cl.$^6$ ..................................................... B32B 17/10
[52] U.S. Cl. ........................... 428/215; 428/337; 428/442
[58] Field of Search ................................. 428/213, 215, 428/337, 441, 442, 426, 446

[56] References Cited

U.S. PATENT DOCUMENTS

| | | | |
|---|---|---|---|
| 2,144,067 | 1/1939 | Kranzlein | 428/442 |
| 3,318,757 | 5/1967 | Atwell | 428/251 |
| 3,734,763 | 5/1973 | Plueddemann | 428/268 |
| 3,955,036 | 5/1976 | Plueddemann | 428/429 |
| 3,998,985 | 12/1976 | Kitaj | 427/386 |
| 4,027,072 | 5/1977 | Molari, Jr. | 428/412 |
| 4,101,705 | 7/1978 | Fischer et al. | 428/220 |
| 4,228,061 | 10/1980 | Plueddemann | 260/31.2 R |
| 4,277,538 | 7/1981 | Beckmann et al. | 428/429 |
| 4,358,329 | 11/1982 | Masuda | 156/106 |
| 4,362,587 | 12/1982 | Baudin et al. | 156/87 |
| 4,382,996 | 5/1983 | Mori et al. | 428/442 |
| 4,397,976 | 8/1983 | Mori et al. | 524/178 |
| 4,911,984 | 3/1990 | Parker | 428/428 |
| 5,013,779 | 5/1991 | Fariss et al. | 524/314 |
| 5,077,133 | 12/1991 | Cheng | 428/426 |
| 5,112,778 | 5/1992 | Cheng et al. | 501/31 |
| 5,264,400 | 11/1993 | Nakaguchi et al. | 501/71 |

FOREIGN PATENT DOCUMENTS

| 1485517 | 9/1977 | United Kingdom . |
|---|---|---|

OTHER PUBLICATIONS

J. Sears, J. Darby, The Technology of Plasticizers, 1982, pp. 1077–1078.

A. Andrady, N. Searle, "Spectral Sensitivity to Light–Induced Yellowing by Polychromatic Light", Journal of Applied Polymer Science, vol. 37, pp. 2789–2802 (1989).

A. Andrady, K. Fueki, A. Torikai, "Wave Length Sensitivity of the Photo–Yellowing Reaction in Processed PVC Formulations", Journal of Applied Polymer Science, vol. 39, pp. 763–766 (1990).

Booklet entitled "Processing for Adhesives Bonded Structures", No. 19, Interscience Publishers, Edwin P. Plueddemann, 1972, pp. 75–90.

Booklet entitled "Organofunctional Silanes", Union Carbide, 1991, pp. 1–60.

*Primary Examiner*—D. S. Nakarani
*Attorney, Agent, or Firm*—Marshall & Melhorn

[57] ABSTRACT

A laminated safety glass is formed of an inboard glass sheet, an outboard glass sheet and a plasticized polyvinyl chloride containing interlayer therebetween. The outboard glass sheet has an average transmittance of radiation in the range of 300–340 nm of less than about 20%, and preferably less than about 1%. The outboard glass sheet also has an average transmittance of radiation in the range of 340 to 500 nm of more than about 50%. The outboard glass sheet may be formed of an ultraviolet radiation absorbing glass, such as an ultraviolet radiation absorbing green glass.

9 Claims, No Drawings

LAMINATED GLAZING UNIT WITH POLYVINYL CHLORIDE INTERLAYER

CROSS REFERENCE TO RELATED APPLICATION

This application is a continuation of application Ser. No. 08/246,816, filed May 20, 1994, now abandoned, which is a continuation in part of U.S. application Ser. No. 08/182,757, filed Jan. 18, 1994 pending.

BACKGROUND OF THE INVENTION

1. Field of the Invention

The present invention relates to laminated glazings and, more particularly, to laminated safety glass having an interlayer including a plasticized polyvinyl chloride resin. The laminated safety glass of the invention is particularly useful for producing automotive and airplane windshields, and architectural glazings.

2. Summary of Related Art

Safety glass is a well known term for a glass sandwich composed of an interlayer bonding together two glass plates or sheets so that breaking the glass results in minimum dispersion of broken glass fragments. The interlayer must possess a number of properties, including the following: high impact energy adsorption to minimize concussive injury; shear and tear strength sufficient to prevent rupture of the interlayer by the broken glass; sufficient adhesion to the glass to inhibit laceration on contact with, and prevent dispersion of, broken glass; acceptable thermal and light stability; acceptable weatherability; and good optical quality. The interlayer must possess these properties over the wide range of temperatures in which these laminated glazings are used for relatively long periods of time.

It has been widely known to use a film of plasticized polyvinyl butyral as the interlayer material in safety glass for automobiles, air planes and building materials because of its high adhesiveness and superior light stability, transparency and low-temperature flexibility. However, the use of plasticized polyvinyl butyral films makes the production of laminated safety glass relatively expensive.

The surface of plasticized polyvinyl butyral film is very tacky, and presents a problem of blocking at the time of windup after film formation. Thus, plasticized polyvinyl butyral film must be provided with some parting means if it is to be stored or transported in the form of stacks of die-cut blanks or in the form of rolls. Furthermore, the production of plasticized polyvinyl butyral films requires specialized equipment and, due to their sensitivity to moisture, plasticized polyvinyl butyral films must generally be handled under controlled atmosphere conditions during manufacture, storage and immediately prior to their incorporation into the laminated safety glass. This all adds to the expense of utilizing plasticized polyvinyl butyral films in laminated safety glass.

Alternative interlayer materials have been proposed. For instance, U.S. Pat. No. 4,277,538 to Beckmann et al discloses a laminated safety glass employing a sheet of plasticized polyvinyl chloride (PVC) as the interlayer. The use of PVC would be advantageous in that it may be produced on conventional equipment and would be much less expensive to manufacture and process into a laminated safety glass when compared with polyvinyl butyral. However, by itself, a PVC film will not adhere to glass. To increase the adhesion of the PVC to glass, Beckmann et al suggest the use of an organofunctional silane, either as a primer or uniformly dispersed within the PVC film.

At least certain of the silicon-organofunctional silanes proposed by Beckmann et al are effective to increase the adhesion of a PVC interlayer to the glass sheets of a laminated safety glass. However, the laminated safety glass employing a PVC interlayer as taught by Beckmann et al does not possess all of the properties required of an interlayer for laminated safety glass, and therefore has not been placed into commercial use. For instance, the Beckmann et al interlayer has poor long term heat and light stability at service use temperatures. With only a few years of exposure to normal use levels of heat and light, the PVC interlayer tends to degrade to the point where it has visibly yellowed and is aesthetically unacceptable, and the haze has increased to the point that visibility through the glazing is significantly impaired. It would therefore be advantageous to develop a laminated safety glass with a PVC interlayer wherein the interlayer exhibits a lower level of degradation over its useful life.

SUMMARY OF THE INVENTION

The invention relates to an improved laminated safety glass having a plasticized polyvinyl chloride interlayer. The laminated safety glass in accordance with the invention is comprised of an inboard glass sheet, an outboard glass sheet and a plasticized polyvinyl chloride containing interlayer therebetween. The outboard glass sheet has an average transmittance of radiation in the range of 300 to 340 nm of less than about 20%. Preferably, the outboard glass sheet has an average transmittance of radiation in the range of 300 to 340 nm of less than about 5%, and most preferably of less than about 1%. The outboard glass sheet may be formed of an ultraviolet radiation absorbing glass, such as an ultraviolet radiation absorbing green glass.

In another aspect of the invention, the outboard glass sheet is formed so as to have an average transmittance of radiation in the range of 300 to 340 nm which is lower than that of the inboard glass sheet.

Various other objects and advantages of this invention will become apparent to those skilled in the art from the following detailed description of the preferred embodiment.

DESCRIPTION OF THE PREFERRED EMBODIMENT

The numerous and varied properties required of an interlayer material for use in laminated safety glass has made it very difficult to successfully develop such laminated safety glass employing a PVC interlayer, even though the cost advantages of so doing are potentially substantial. As mentioned above, the properties an interlayer must possess include: high impact energy adsorption; shear and tear strength sufficient to prevent rupture of the interlayer by broken glass; sufficient adhesion to the glass to inhibit laceration on contact with, and prevent dispersion of, broken glass; acceptable thermal and light stability; acceptable weatherability; and good optical quality. The laminated safety glass employing a plasticized PVC containing film in accordance with the invention exhibits all of these properties and is less expensive to produce than a comparable laminated safety glass employing polyvinyl butyral.

In accordance with the invention, the interlayer is preferably formed of a high number average molecular weight vinyl chloride homopolymer, copolymer or graft polymer, or combinations thereof. Preferably, the interlayer is formed of polyvinyl chloride homopolymer having a number average molecular weight, or a mixture of number average molecular weights, of at least 30,000. In a preferred embodiment, the number average molecular weight, or mixture of number average molecular weights, is between about 40,000 and about 165,000, with a degree of polymerization of about 500 to 2600. One preferred PVC resin is SE-1300, having a degree of polymerization of 1300 and a number average molecular weight of 80,600, which is commercially available from Shintech Inc. of Houston, Tex. Control of the molecular weight distribution and purity of the PVC has been found to be very important in a safety glass interlayer application. Variances in molecular weight distribution can have a profound effect on the impact properties and processability of the film. In addition, the presence of impurities, such as polymerization initiators, can lead to excessive degradation and yellowing of the interlayer and can have a detrimental effect on the long term heat stability of the interlayer. Accordingly, the PVC is preferably formed by suspension polymerization, which offers superior control of molecular weight and the removal of impurities.

It may be that a plasticized film containing a blend of a PVC homopolymer with a copolymer, such as a copolymer of vinyl chloride with vinyl acetate or methylacrylate, or with another homopolymer, such as polycaprolactone or polyurethane, may provide an improved interlayer. Such a blends may exhibit improved flow properties, and hence improved processability, over the PVC homopolymer.

The plasticizers for the preparation of the plasticized films containing PVC in accordance with the invention can be linear or branched aliphatic diesters, triesters or tetraesters, or aromatic diesters, triesters or tetraesters, or mixtures thereof. From a performance standpoint, preferred plasticizers include dihexyl azelate (DHZ), dihexyl adipate (DHA) and dioctyl azelate (DOZ). However, dioctyl adipate (DOA), while providing slightly reduced performance relative to the other noted plasticizers, may be most preferred in view of its combination of performance and relatively lower cost.

The plasticizer concentration is between about 40 to about 70 parts per hundred weight resin (phr), depending primarily upon the number average molecular weight and molecular weight distribution of the PVC containing resin. A plasticizer concentration of between about 50 and about 60 phr is most preferred.

To form acceptable laminated safety glazings from the plasticized PVC containing films, heat stabilizers are generally required to provide both high temperature heat stability as well as long term, service use temperature heat stability. In fact, it has been theorized that a certain low level of degradation, resulting in an increased level of unsaturation, of the PVC film is necessary to obtain proper adhesion. Accordingly, the heat stabilizers for the PVC film are preferably optimized for such service use temperature heat stability; that is, for temperatures up to about 65° C., but typically over the range of about −40° C. to 70° C.

The PVC containing film is provided with between about 1 to 5, preferably 2 to 4 phr of a primary heat stabilizer including an organometallic compound, such as salts of the alkaline metals and selected transition metals, including aluminum, barium, cadmium, calcium, lead, magnesium, tin, and zinc. Zinc salts of organic acids provide the best low temperature heat stability for the PVC containing film. However, a resulting byproduct is $ZnCl_2$, which enhances degradation in the PVC containing film and may lead to catastrophic failure of the interlayer formed therewith. The addition of a chelating agent, such as a [beta]-diketone, a phosphite, is or both, reduces the chance of catastrophic failure. In addition, it has been found that a barium salt of an organic acid mixed with the zinc salt of an organic acid reduces the chance of, or at least delays, catastrophic failure.

The primary heat stabilizer preferably includes a mixture of a zinc salt of an organic acid and a barium, calcium or tin salt of an organic acid, or a mixture thereof. The primary heat stabilizer preferably includes from about 1.6 to 4.0% atomic zinc as a zinc salt of an organic acid, and from about 7.0 to 14.0% atomic barium as a barium salt of an organic acid. The zinc salt may be, for example, zinc stearate, zinc laurate, zinc oleate, zinc iso-stearate, zinc octoate, or zinc decanate, or mixtures thereof. Likewise, examples of suitable barium and calcium salts include barium or calcium stearate, laurate, oleate, iso-stearate, octoate, or decanate, nonylphenolate, or mixtures thereof.

To maximize the long term, service use temperature heat stability of a PVC film used as a safety glass interlayer, the primary heat stabilizer also preferably includes from about 2.0 to 4.0% phosphorus as phosphites. A preferred phosphite has been found to be triphenyl phosphite.

In addition to the primary heat stabilizer, the PVC containing film also preferably includes several secondary heat stabilizers, including epoxidized oils, perchlorates, and 1,3 [beta]-diketones. From about 2.5 to 15.0 phr of an epoxidized oil is preferably included as a secondary heat stabilizer in the PVC containing film. A preferred epoxidized oil is epoxidized soybean oil. The PVC film also preferably includes from about 0.1 to 1.0 phr of a perchlorate, a preferred perchlorate being sodium perchlorate. As another secondary heat stabilizer, the PVC film is provided with between about 0.1 and 2.0 phr of a 1,3 [beta]-diketone. A preferred 1,3 [beta]-diketone has been found to be stearyl benzoyl methane.

As noted above, a PVC film will not adhere to glass by itself; some means of adhesion promotion is required to obtain a suitable safety glass wherein the interlayer has sufficient adhesion to the glass to inhibit laceration on contact with, and prevent dispersion of, broken glass. Several organofunctional silanes are suitable for use as an adhesion promoter, including aminofunctional silanes, especially N-[beta-(N'-paravinylbenzyl)-aminoethyl ]-gamma-aminopropyltrimethoxy-silane hydrochloride (commercially available as Z6032 from Dow Corning), and mercaptofunctional silanes, especially gamma mercapto propyl triethoxy silane. To obtain acceptable adhesion, prehydrolysis of the silane to a low molecular weight monomer or oligomer is required. The organofunctional silane adhesion promoter may be applied to the glass/interlayer interface, or may be incorporated into the formulation which is formed into the interlayer.

The PVC containing film also preferably includes other additives, such as UV light stabilizers, antioxidants, optical brighteners, dyes and the like. Thus, the safety glass interlayer of the invention is preferably formed from a formulation including from about 0 to 2 phr of a benzophenone or benzotriazole derivative as a UV stabilizer, from about 0 to 5 phr hindered phenols as an antioxidant, from about 0 to 1 phr of a fluorescent or whitening agent, and from about 0 to 1 phr of a blue dye. In a most preferred embodiment, a UV light stabilizer is applied to the outer glass sheet and/or the surface of the PVC containing interlayer adjacent the outer glass sheet by a suitable application method, such as spraying. The UV light stabilizer is most preferably mixed with the functional silane adhesion promoter and then applied to the outer glass sheet/interlayer interface. Concentration of the UV light stabilizer at the surface of the interlayer has been found to reduce degradation of the PVC containing film.

It has been found to be advantageous to incorporate the PVC containing film in a laminated safety glass wherein at least one of the glass sheets is formed of a glass which reduces the transmittance of UV radiation, by absorption, reflection, or a combination of both. Further, exposure to radiation in the range of about 280 nanometers to about 340 nanometers causes degradation and yellowing of a PVC containing interlayer. On the other hand, exposure to radiation in the range of about 340 nanometers to about 500 nanometers has a photobleaching effect on a PVC containing interlayer which acts counter to the yellowing effect. A glass sheet which permits the transmission of a relatively low amount of radiation in the range from about 280 nanometers to about 340 nanometers thus helps to prevent degradation and yellowing of the PVC containing interlayer, and the development of high haze in the glazing unit. It will also help to prevent degradation and yellowing of the PVC containing interlayer if this glass sheet permits the transmission of a relatively higher amount of radiation in the range from about 340 nanometers to about 500 nanometers.

At least the outboard glass sheet has an average transmittance of radiation in the range of 300 to 340 nm of less than about 20%. Below 300 nm, less than 1% of the radiation is transmitted through even a conventional clear glass sheet when at a thickness in the range of about 1.5 mm to about 2.7 mm. Preferably, the outboard glass sheet has an average transmittance of radiation in the range of 300 to 340 nm of less than about 5%, and most preferably of less than about 1% in this range. In addition, the glass sheets will also preferably have an average transmittance in the range of 340 to 500 nm of at least 50%, and more preferably of at least 60%.

The glass sheets in accordance with the invention also preferably allow the transmittance of 50% or less of the radiation at 340 nm. More preferably, the glass sheets will allow the transmittance of 25% or less of the radiation at 330 nm, and most preferably only 1% or less of such radiation. Likewise, the glass sheets in accordance with the invention will preferably allow the transmittance of 20% or less of the radiation at 330 nm. More preferably, the glass sheets will allow the transmittance of 5% or less of the radiation at 330 nm, and most preferably only 1% or less of such radiation.

For such a laminated glazing unit embodied as an automotive windshield, the Illuminant A visible light transmittance must be greater than 70%. Compositions of a suitable glass having such a transmittance include, as examples, the infrared and ultraviolet absorbing green glasses described in the U.S. Pat. Nos. 5,077,133 and 5,112,778, which are incorporated herein by reference.

In a laminated glazing unit such an automotive windshield or an architectural window, it may be preferable to form only the outboard glass sheet of a glass sheet having a relatively low transmittance in the range of 300 to 340 nm, while the inboard glass sheet is formed from a glass sheet having a relatively higher transmittance in this range. Since most of the radiation passes through the interlayer before passing through the inboard glass sheet, forming the inboard glass sheet from a UV absorbing glass would be ineffective in reducing the radiation in this range which passes through the interlayer. Further, if the inboard glass sheet is formed of a glass sheet which reflects radiation in this range, the radiation will be reflected back through the interlayer, resulting in additional degradation. In addition, if the inboard glass sheet is somewhat less radiation absorbing, the outboard glass sheet can be formed with a greater absorption in this range without reducing the visible light transmittance to levels which are unacceptable in an automotive windshield. Thus, in a preferred embodiment, the outboard glass sheet is formed so as to have a lower average transmittance in the range of 300 to 340 nm than that of the inboard glass sheet.

The following examples are illustrative of the invention and do not constitute any limitation with regard to the subject matter of the invention.

EXAMPLE 1

Windshield size laminates were formed from sheets of an infrared and ultraviolet radiation absorbing green glass, sold commercially by Libbey-Owens-Ford Co. under the trademark EZ-KOOL, and a film 0.045" thick having the following formulation:

| Component | phr |
| --- | --- |
| Shintech 1300 PVC Resin[1] | 100 |
| DHZ | 55 |
| Drapex 6.8[2] | 3 |
| No. 5377[3] | 0.1 |
| Tinuvin 328[4] | 0.5 |
| L-1960[5] | 1.5 |
| KP-11[6] | 0.5 |

[1]PVC resin having a degree of polymerization of 1300 available from Shintech Inc. of Freeport, TX.
[2]Epoxidized soybean oil available from Witco Corp. of Oakland, NJ.
[3]Perchlorate stabilizer available from Akishima Chemical Corp. of Japan.
[4]Benzatriazole ultravioiet light stabilizer available from Ciba-Geigy Corp.
[5]Barium/zinc stabilizer package available from Synthetic Products Co. of Cleveland, OH.
[6]Barium/zinc stabilizer available from Asahi Denka Kogyo K.K. of Japan.

The film was subjected to a corona discharge treatment of about 20 to 40 watts/m$^2$/minute. An adhesion promoter of a 4% solution of prehydrolyzed N-[beta-(N'-paravinylbenzyl)-aminoethyl ]-gamma-aminopropyltrimethoxy-silane hydrochloride (commercially available as Z6032 from Dow Corning) in methanol was applied to the interface between the glass sheets and the film.

The laminates were formed with an autoclave cycle consisting of: 1) a 10 minute temperature ramp to 340° F. and an 8 minute pressure ramp at 240 psi; 2) a 25 minute hold at 340° F. and 240 psi; and 3) a 10 minute ramp down to room temperature and pressure.

The samples obtained had an initial yellowness index (YIC) of 1.3, as measured with a Spectrogard from Gardner/BYK of Silver Springs, Md. Some laminates were then placed in an oven set at 100° C. for 500 hours, after which the YIC was determined to be 3.6. Other samples were placed in an oven set at 65° C. for 13,768 hours, after which the YIC was determined to be 3.0. The transmitted % haze was measured with a Hazegard XL200 from Gardner/BYK to be 1%.

EXAMPLE 2

Flat laminates were formed from 2 feet by 3 feet sheets of glass and a film having the following formulation:

| Component | phr |
| --- | --- |
| 1300 PVC Resin | 70 |
| 950 PVC Resin[7] | 30 |
| DOZ | 50 |
| Drapex 6.8 | 3 |
| KP-11 | 0.3 |
| L-1960 | 1.5 |
| Tinuvin 328 | 0.5 |
| No. 5377 | 0.05 |

[7]PVC resin having a degree of polymerization of 950 available from Shintech Inc.

The laminates were formed using a 0.045" film formed of the above composition with two sheets of an infrared and ultraviolet absorbing green glass sold commercially by Libbey-Owens-Ford Co. under the trademark EZ-KOOL; a lightly tinted green glass sold commercially by Libbey-Owens-Ford Co. under the trademark EZ-EYE; and a clear glass. The percent transmittance of radiation in the range of 300–400 nm was measured and is shown below for a 2.2 mm (0.088") thick sheet of each of these glasses:

| WAVELENGTH | CLEAR GLASS | EZ-EYE GLASS | EZ-KOOL GLASS |
| --- | --- | --- | --- |
| 300 | 0.23 | 0.0 | 0.0 |
| 305 | 1.43 | 0.0 | 0.01 |
| 310 | 5.36 | 0.0 | 0.01 |
| 315 | 13.42 | 0.0 | 0.00 |
| 320 | 25.70 | 0.09 | 0.04 |
| 325 | 39.69 | 0.73 | 0.04 |
| 330 | 53.47 | 3.83 | 0.02 |
| 335 | 64.81 | 11.60 | 0.02 |
| 340 | 73.11 | 23.93 | 0.02 |
| 345 | 79.16 | 38.10 | 0.13 |
| 350 | 83.42 | 51.49 | 1.97 |
| 355 | 85.76 | 61.63 | 10.06 |
| 360 | 87.31 | 69.48 | 24.75 |
| 365 | 88.47 | 74.47 | 40.63 |
| 370 | 88.65 | 77.05 | 51.30 |
| 375 | 88.92 | 75.26 | 54.71 |
| 380 | 88.46 | 73.45 | 54.77 |
| 385 | 88.86 | 76.39 | 60.40 |
| 390 | 89.57 | 80.81 | 67.06 |
| 395 | 90.19 | 83.26 | 71.89 |
| 400 | 90.48 | 84.58 | 74.48 |

The average transmittance for the range of 300 to 340 nm was 30.8% for the clear glass, 4.5% for the EZ-EYE glass, and 0.02% for the EZ-KOOL glass. The average transmittance for the range of 340 to 500 nm was 89.0% for the clear glass, 78.6% for the EZ-EYE glass, and 63.6% for the EZ-KOOL glass. The average transmittance for the range of 340 to 400 nm was 86.3% for the clear glass, 66.9% for the EZ-EYE glass, and 39.4% for the EZ-KOOL glass.

These laminates were mounted so as to simulate installation in a vehicle and were placed outdoors in Arizona. After 34 months, the change in YIC for the clear glass laminates was measured to be about 7.3; the change in YIC for the EZ-EYE glass laminates was measured to be about 4.6; and the change in YIC for the EZ-KOOL glass laminates was measured to be about 1.2. A model developed to predict yellowing based solely on thermal effects predicted a change in YIC of about 5.2 after 34 months. The larger change in YIC measured for the clear glass laminates is believed to be due to the photodegradation caused by the radiation in the range of 280 to 340 nm. The smaller changes in YIC measured for both the EZ-EYE and EZ-KOOL glass laminates are believed to be due to the photobleaching effect of the radiation in the range of 330 to 500 nm, as well as the reduction or virtual elimination of the photodegradation effects of the radiation in the range of 280 to 340 nm.

In accordance with the provisions of the patent statutes, the invention has been described in what is considered to represent its preferred embodiment. However, it should be noted that the invention can be practiced otherwise than as specifically illustrated and described without departing from its spirit or scope.

What is claimed is:

1. A laminated glazing unit, comprising a first glass sheet, a second glass sheet and a plasticized polyvinyl chloride containing film therebetween, wherein said first glass sheet is formed of a glass that, when at a thickness of about 2.2 mm, has an average transmittance of radiation having wavelengths in the range of 300–340 nm of less than about 20%, an average transmittance of radiation having wavelengths in the range of 340–500 nm of more than about 50%, and an average transmittance of radiation having wavelengths in the range of 340 to 400 nm of more than about 39%.

2. A laminated glazing unit as defined in claim 1, wherein said first glass sheet is formed of a glass that, when at a thickness of about 2.2 mm, has an average transmittance of radiation having wavelengths in the range of 300–340 nm of less than about 5%.

3. A laminated glazing unit as defined in claim 2, wherein said first glass sheet is formed of a glass that, when at a thickness of about 2.2 mm, has an average transmittance of radiation having wavelengths in the range of 300–340 nm of less than about 1%.

4. A laminated glazing unit as defined in claim 1, wherein said first glass sheet is formed of a glass that, when at a thickness of about 2.2 mm, has an average transmittance of radiation having wavelengths in the range of 340 to 500 nm of more than about 60%.

5. A laminated glazing unit as defined in claim 1, wherein said first glass sheet is formed of a glass that, when at a thickness of about 2.2 mm, has a transmittance of 5% or less of the radiation having a wavelength of 330 nm.

6. A laminated glazing unit as defined in claim 5, wherein said first glass sheet is formed of a glass that, when at a thickness of about 2.2 mm, has a transmittance of 1% or less of the radiation having a wavelength of 330 nm.

7. A laminated glazing unit as defined in claim 1, wherein said first glass sheet is an outboard glass sheet and said second glass sheet is an inboard glass sheet, said outboard glass sheet being formed of a glass that, when at a thickness of about 2.2 mm, has an average transmittance of radiation having wavelengths in the range of 300–340 nm which is lower than that of said inboard glass sheet when said inboard glass sheet is also at a thickness of about 2.2 mm.

8. A laminated glazing unit as defined in claim 1, wherein said first glass sheet is formed of an ultraviolet radiation absorbing green glass.

9. A laminated glazing unit as defined in claim 1, wherein said first glass sheet is formed of a glass that, when at a thickness of about 2.2 mm, has a transmittance of radiation of a wavelength of 400 nm of at least about 74%.

* * * * *